C. E. STRECKER.
VALVE.
APPLICATION FILED APR. 8, 1913.

1,144,875. Patented June 29, 1915.

Witnesses

Inventor
Charles E. Strecker
By F. B. Fetherstonhaugh
His Attorney

UNITED STATES PATENT OFFICE.

CHARLES E. STRECKER, OF MONTREAL, QUEBEC, CANADA.

VALVE.

1,144,875.  Specification of Letters Patent.  Patented June 29, 1915.

Application filed April 8, 1913. Serial No. 759,670.

*To all whom it may concern:*

Be it known that I, CHARLES E. STRECKER, of the city of Montreal, in the Province of Quebec and Dominion of Canada, have invented certain new and useful Improvements in Valves, of which the following is a full, clear, and exact description.

This invention relates to improvements in valves, and more particularly to gate valves, and the object is to provide a valve of simple and inexpensive construction having the gate formed in two parts each engaging a separate seat.

A further object is to provide a gate valve so arranged that the lodgment of foreign matter on one of the seats or gate members will not prevent the accurate seating of the other gate member.

A still further object is to provide a gate valve having a two part gate adapted for use with the stationary spindle.

To accomplish these objects, I provide a valve body of the usual design having a stationary spindle. The gate is formed in two parts each having two lugs and two pockets, adapted to coöperate with corresponding elements on the other portion of the gate and formed to permit the two portions to move in any direction independently. A spindle nut is secured between the gate portions.

Figures 1, 2:
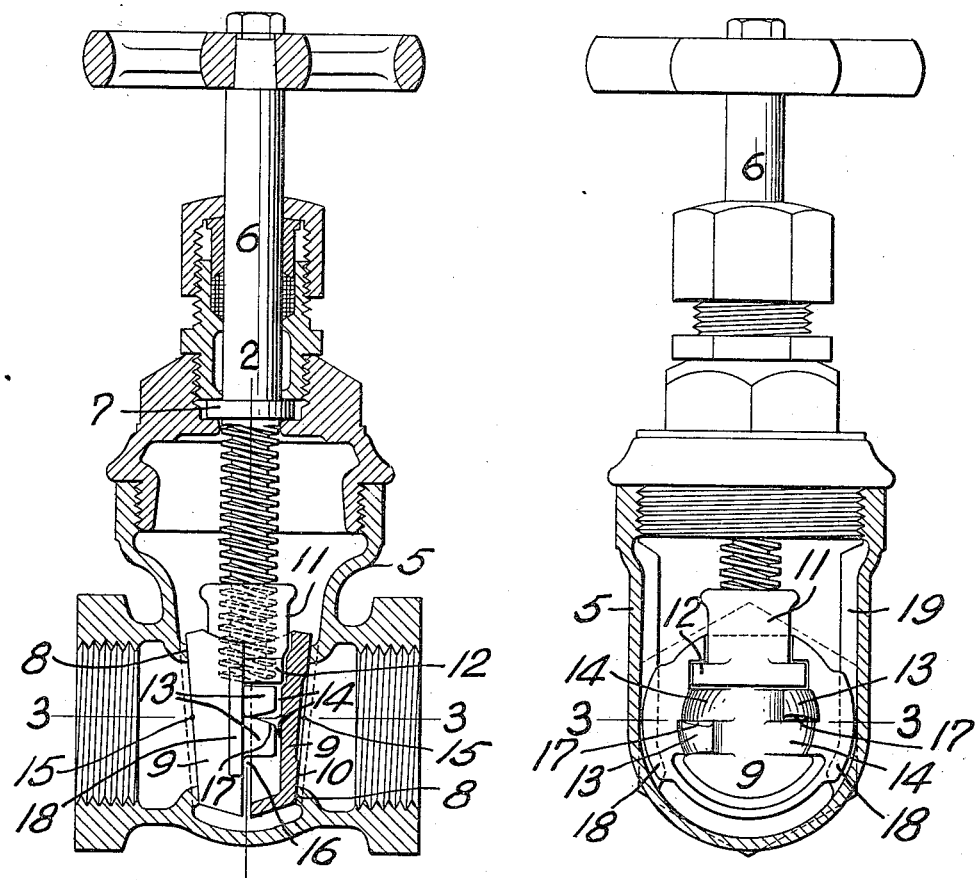
Figure 3:
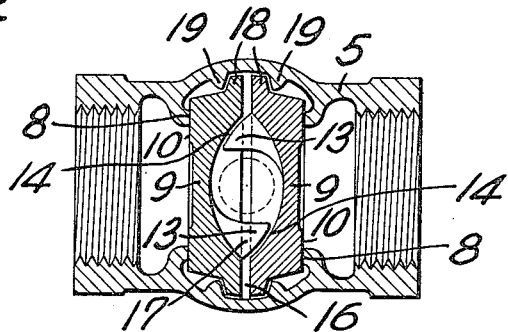

In the drawings which illustrate the invention:—Figure 1 is a vertical sectional view of the valve. Fig. 2 is a view partly in elevation and partly in section on the line 2—2, Fig. 1. Fig. 3 is a horizontal section on the line 3—3, Figs. 1 and 2.

Referring more particularly to the drawings, 5 designates a gate valve body formed in as many parts as desired, and provided with a spindle 6. If the valve is of the stationary spindle type, as shown in the drawings, the spindle is provided with a collar 7 held against vertical movement by the parts of the valve, and thus holding the spindle against similar movement but not against rotary movement. In the lower part of the body are two gate seats 8 arranged in planes converging toward the bottom of the valve.

The gate consists of a pair of similar members 9 having their opposite faces 10 arranged in converging planes parallel with the planes of the seats 8, so that normally the gate will bear evenly on both seats and form a fluid tight joint entirely around the seats. The upper part of each gate is suitably recessed to receive a spindle nut 11 which is held against revolution in the gate by means of lugs 12. Each gate member 9 is provided with a pair of lugs 13 arranged on opposite sides of the vertical and horizontal center lines. Pockets 14 are formed in each gate member in the same arrangement as the lugs 13, but on opposite sides of the center lines therefrom, and may therefore be said to be arranged alternately with the lugs. The lugs of each gate member have their outer surfaces spherically curved, the center of said sphere being at the intersection of the horizontal axis of the member with its seating surface 10. This point of intersection is designated 15. The pockets 14 of each gate member have their bottoms spherically curved, the center of said sphere being the point 15 of the other gate member. This arrangement of pocket and lug curvatures is obviously such that the curvature of the lugs on one member exactly coincides with the curvature of the pockets on the other member, so that the two gate members may be moved with respect to one another in any direction. In other words, the lugs and pockets form a universal or ball and socket joint between the two gate members. In order to permit this independent movement of the gate members, their adjacent edges are cut away so as to leave a space 16. In order to insure perfect movement in all directions, the lower sides of the upper lugs 13 and the upper sides of the lower lugs are curved, as indicated at 17, so that these lugs will rock on one another and permit the gate members to assume any position. If this curvature were not provided the lugs would bind during movement in one direction, and thus detract from the efficiency of the device.

The gate members are provided at their adjacent edges with lugs 18 arranged diametrically opposite, and adapted to move vertically between guides 19 formed on the inner surface of the valve body in the usual manner. These guides operate to hold the gate members in engagement with one another when the gate is raised into the upper part of the body. It will be seen from Figs. 2 and 3 that the lugs 13 are spaced sufficiently apart to leave room between them for the stem 6, so that the gate may be raised until the stem engages the bottom of the gate, which will not occur before the gate is raised to full open position.

It is obvious that this particular form of gate may be applied to a rising stem valve by placing the collar 7 between the gate members and attaching the nut 11 to the valve body.

The operation of the device is very simple. When the spindle is rotated, the nut moves upwardly and draws up the gate, which normally operates as if made in one solid piece. When closed, the gate wedges between the converging seats in the usual manner. If, however, foreign matter has found lodgment on one of the seats 8 or gate seating surfaces 10, it will obviously hold this portion of the gate away from its seat. The other gate member will, however, move relatively to the blocked member and adjust itself in any direction so as to form a tight closure with its seat.

Two part valve gates have been previously designed either with a double pivotal connection so as to have movement in two directions or with a large ball and socket joint located at the center of the members. The first mentioned arrangement obviously adjusts itself in only two directions, while the second arrangement has the disadvantage that one gate member is much heavier than the other, and that the lighter or socket member is so much weakened at the center that it will not stand long usage without buckling. Furthermore, this central arrangement of the ball and socket prohibits the use of a stationary spindle without increasing the dimensions of the body to an utterly impractical and uncommercial extent.

From the foregoing, it will be seen that the present invention provides a valve gate of superior design having all the advantages of the ball and socket arrangement with an added advantage that it may be used with a stationary spindle.

Having thus described my invention, what I claim is:—

1. In a valve, a body, a two part gate having seat surfaces on opposite sides thereof, a pair of lugs on each gate member having spherically curved outer surfaces, and recesses in each gate member having spherically curved bottoms for the reception of the lugs of the other gate member.

2. In a valve, a body, a gate composed of two similar members, a pair of lugs on each gate member, and a pair of recesses in each gate member positioned to receive the lugs of the other member, said lugs and recesses having their abutting surfaces spherically curved, the center of said curvature being at the center of the outer side of said gate.

3. In a valve, a body, a gate comprising two similar members having seat surfaces on their remote faces, a pair of lugs and a pair of recesses formed on the adjacent faces of said members, the lugs of one member being positioned to engage in the recesses of the other member, said lugs having their outer surfaces spherically curved from a center coincident with the center of the seating face, and said recesses having their bottoms spherically curved from a center coincident with the center of the seating face of the other member.

In witness whereof I have hereunto set my hand in the presence of two witnesses.

CHARLES E. STRECKER.

Witnesses:
STUART R. W. ALLEN,
G. M. MORELAND.

Copies of this patent may be obtained for five cents each, by addressing the "Commissioner of Patents, Washington, D. C."